(12) United States Patent
Komano et al.

(10) Patent No.: US 6,762,355 B2
(45) Date of Patent: Jul. 13, 2004

(54) ELECTRONIC MUSICAL INSTRUMENT

(75) Inventors: Takeshi Komano, Hamamatsu (JP); Shinichi Ito, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/503,546

(22) Filed: Feb. 14, 2000

(65) Prior Publication Data

US 2002/0112595 A1 Aug. 22, 2002

(30) Foreign Application Priority Data

Feb. 22, 1999 (JP) ............................................ 11-043797

(51) Int. Cl.[7] .............................................. G09B 15/00
(52) U.S. Cl. ....................... 84/477 R; 84/615; 84/653; 84/478
(58) Field of Search .................... 84/609–610, 615–618, 84/626, 649–650, 654–656, 658, 477 R, 478, 653

(56) References Cited

U.S. PATENT DOCUMENTS

| | | | | |
|---|---|---|---|---|
| 5,296,642 A | * | 3/1994 | Konishi | 84/609 |
| 5,399,800 A | | 3/1995 | Morita et al. | |
| 5,430,242 A | * | 7/1995 | Morita | 84/609 |
| 5,508,470 A | * | 4/1996 | Tajima et al. | 84/609 |
| 5,739,457 A | * | 4/1998 | Devecka | 84/743 |
| 6,137,480 A | * | 10/2000 | Shintani | 345/169 |

FOREIGN PATENT DOCUMENTS

| | | |
|---|---|---|
| JP | 05-204298 | 8/1993 |
| JP | 05-204301 | 8/1993 |
| JP | 07-295562 | 11/1995 |
| JP | 08-202537 | 8/1996 |

* cited by examiner

*Primary Examiner*—Marlon T. Fletcher
(74) *Attorney, Agent, or Firm*—Morrison & Foerster LLP

(57) ABSTRACT

An electronic musical instrument is equipped with manual operators such as switches and controls arranged on an operation panel and keys of a keyboard as well as a display and a tone generator. It is characterized by automatically running demonstration programs when it is supplied with electric power but is left unattended at a store or in an exhibition area. The demonstration programs are started after a lapse of a predetermined time or more under prescribed conditions where none of the manual operators is operated by a user, no tone-generation instruction is issued with respect to automatic performance being played by internal functions, and no tone-generation instruction is issued with respect to external performance data being supplied by means of a communication interface. Under each of those conditions, the electronic musical instrument automatically runs a display demonstration program for displaying preset images on a screen of the display and/or a sound demonstration program for generating preset sounds. Specifically, the display automatically shows specifications, system configurations and messages with regard to the electronic musical instrument. In addition, the tone generator automatically generates automatic performance sounds or vocalized sounds of voice guidance to overall operation of the electronic musical instrument. Thus, it is possible to attract interests of visitors and customers at stores or exhibition areas.

11 Claims, 13 Drawing Sheets

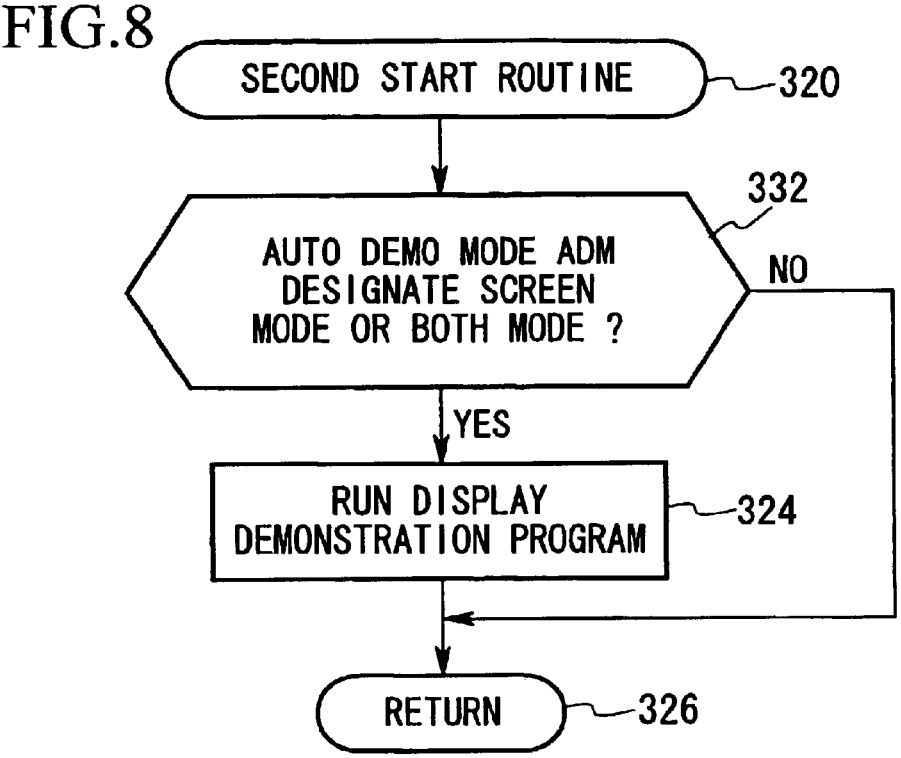
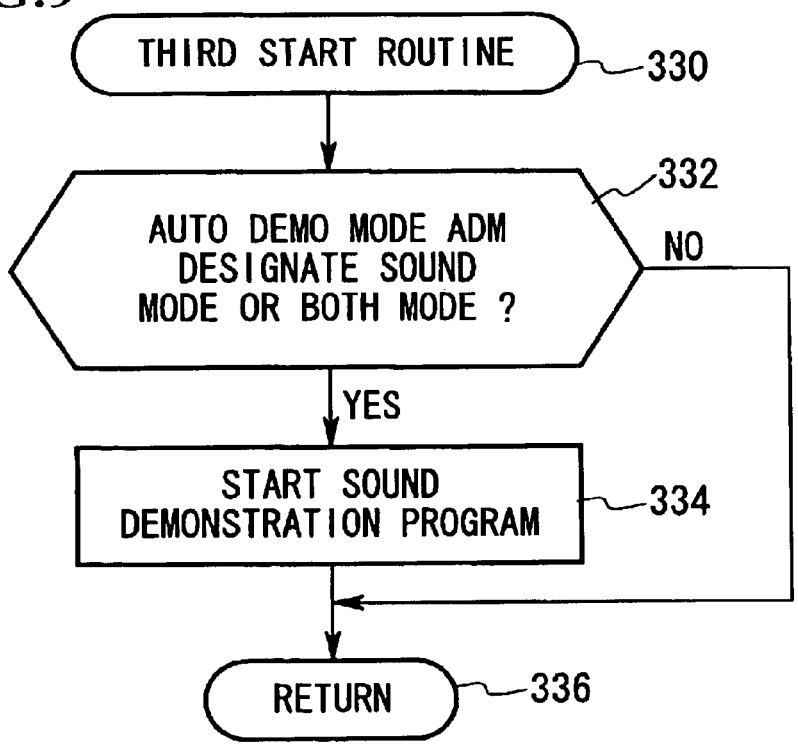

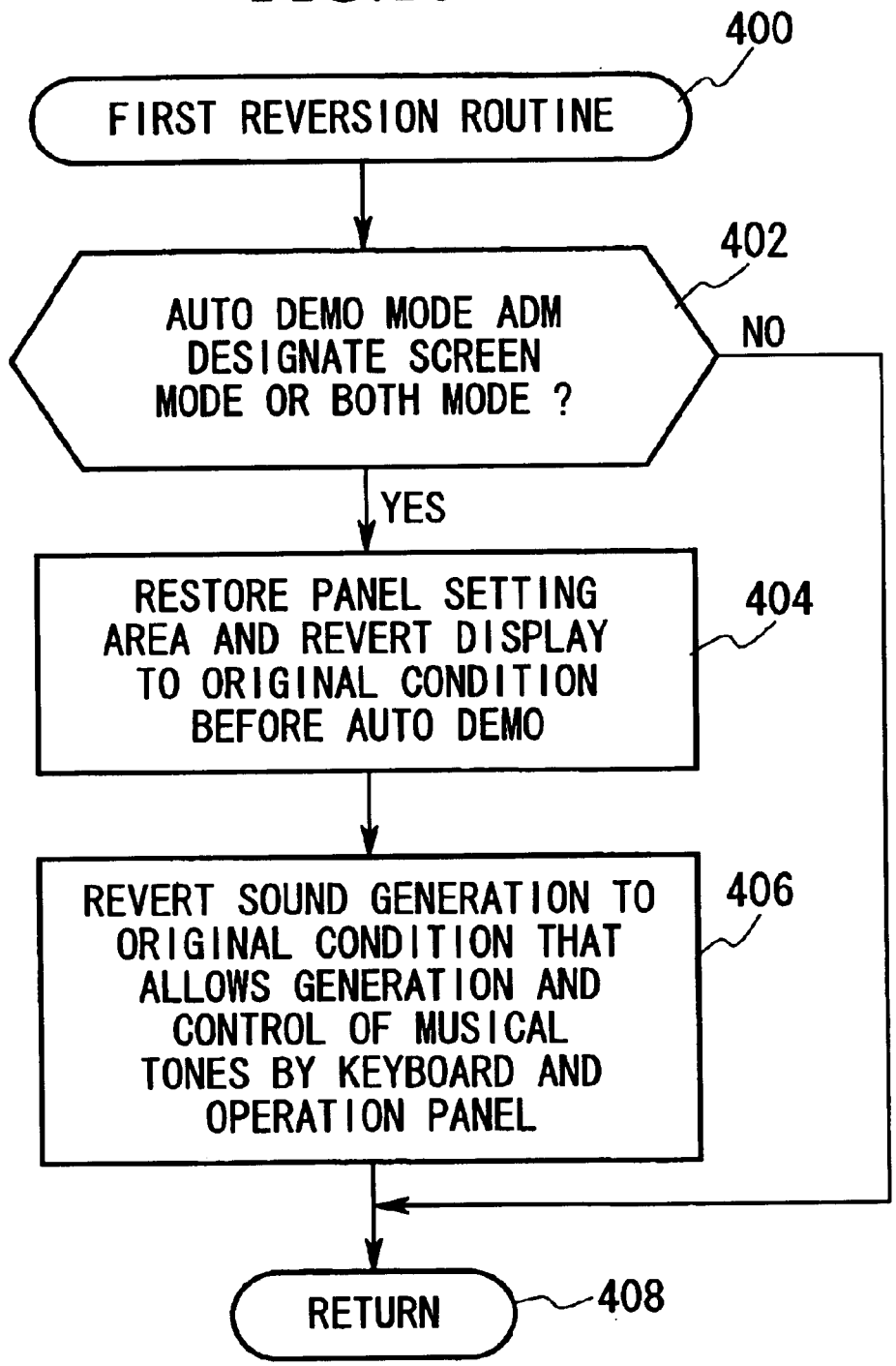

ELECTRONIC MUSICAL INSTRUMENT

BACKGROUND OF THE INVENTION

1. Field of the Invention

This invention relates to electronic musical instruments equipped with displays, in which musical tones are generated under control of manual operators while instructive information such as characters are displayed on screens.

This application is based on Patent Application No. Hei 11-43797 filed in Japan, the content of which is incorporated herein by reference.

2. Description of the Related Art

Some of the electronic musical instruments conventionally known have hardware systems and software architectures in which musical tones are generated and controlled in states in accordance with manual operations applied to manual operable members such as switches, controls and wheels (hereinafter, simply referred to as "manual operators" which are manually operated by human operators, for example) while instructive information being represented by characters or else are displayed on screens. Namely, the electronic musical instruments of this kind are equipped with manual operators for controlling generation of the musical tones in various states, displays for displaying characters on screens and tone generators for generating the musical tones in accordance with tone-generation instructions.

Conventionally, some electronic musical instruments have functions by which power supply is automatically cut off if no manual operator is operated for a prescribed time or more. In addition, some computers have functions by which visual images of displays are changed over if keyboards are not operated for a prescribed time or more.

The aforementioned functions of the electronic musical instruments are provided for the saving of electric power being consumed. In addition, the functions of the computers are provided to prevent screens of the displays from being subjected to burnout. For sale and advertisement, the electronic musical instruments are normally displayed at stores and/or in exhibition areas so that visitors and buyers are able to actually operate them. Within the electronic musical instruments which are displayed at the stores or else, some electronic musical instruments are not provided for the visitors to actually operate and are automatically cut out for the purpose of the saving of electric power being consumed. Or, some electronic musical instruments are continuously supplied with electric power but are left unattended. The electronic musical instruments of the aforementioned conditions cannot attract interests of the visitors or customers. So, the conventional electronic musical instruments are not designed to raise advertisement effects at the stores and/or in the exhibition areas.

SUMMARY OF THE INVENTION

It is an object of the invention to provide an electronic musical instrument, which is capable of displaying images (or visuals) for demonstration and/or which is capable of generating sounds for demonstration.

Thus, the electronic musical instrument which is continuously supplied with electric power but is left unattended is able to demonstrate functions and performance thereof, so it is possible to attract interests of visitors and customers in sale and advertisement at stores or else.

Basically, an electronic musical instrument of this invention is equipped with manual operators such as switches and controls arranged on an operation panel and keys of a keyboard as well as a display and a tone generator. It is characterized by automatically running demonstration programs when it is supplied with electric power but is left unattended at a store or in an exhibition area. The demonstration programs are started after a lapse of a predetermined time or more under prescribed conditions where none of the manual operators is operated by a user, no tone-generation instruction is issued with respect to automatic performance being played by internal functions, and no tone-generation instruction is issued with respect to external performance data being supplied by means of a communication interface. Under each of those conditions, the electronic musical instrument automatically runs a display demonstration program for displaying preset images on a screen of the display and/or a sound demonstration program for generating preset sounds. Specifically, the display automatically shows specifications, system configurations and messages with regard to the electronic musical instrument. In addition, the tone generator automatically generates automatic performance sounds or vocalized sounds of voice guidance to overall operation of the electronic musical instrument.

When a manual operation to the manual operator is detected during execution of the demonstration programs, or when a tone-generation instruction is detected with respect to the automatic performance or external performance data during execution of the demonstration programs, the electronic musical instrument automatically stops running the demonstration programs and is reverted to a normal condition that allows the setting of tone colors and/or effects with regard to musical tones by the manual operators and that allows generation of musical tones with performance of the keyboard.

By the aforementioned automated demonstrations, it is possible to attract interests of visitors and customers at the store or in the exhibition area although the electronic musical instrument being supplied with electric power is displayed and is left unattended.

BRIEF DESCRIPTION OF THE DRAWINGS

These and other objects, aspects and embodiment of the present invention will be described in more detail with reference to the following drawing figures, of which:

FIG. 8 is a flowchart showing a second start routine;

FIG. 9 is a flowchart showing a third start routine;

FIG. 10 is a flowchart showing a first reversion routine;

DESCRIPTION OF THE PREFERRED EMBODIMENT

This invention will be described in further detail by way of examples in conjunction with the accompanying drawings.

Figure 1:
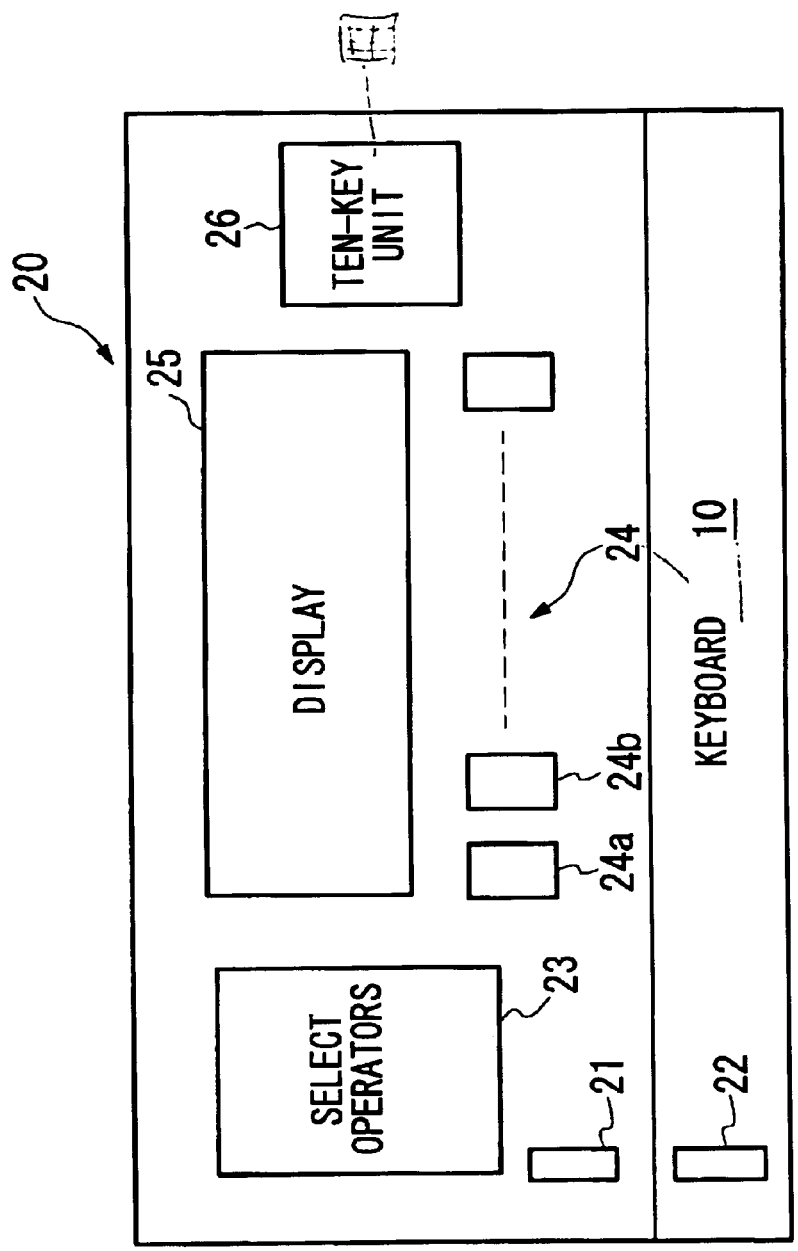
FIG. 1 is a plan view diagrammatically showing a part of appearance of an electronic musical instrument in accordance with embodiment of the invention.
Figure 2:
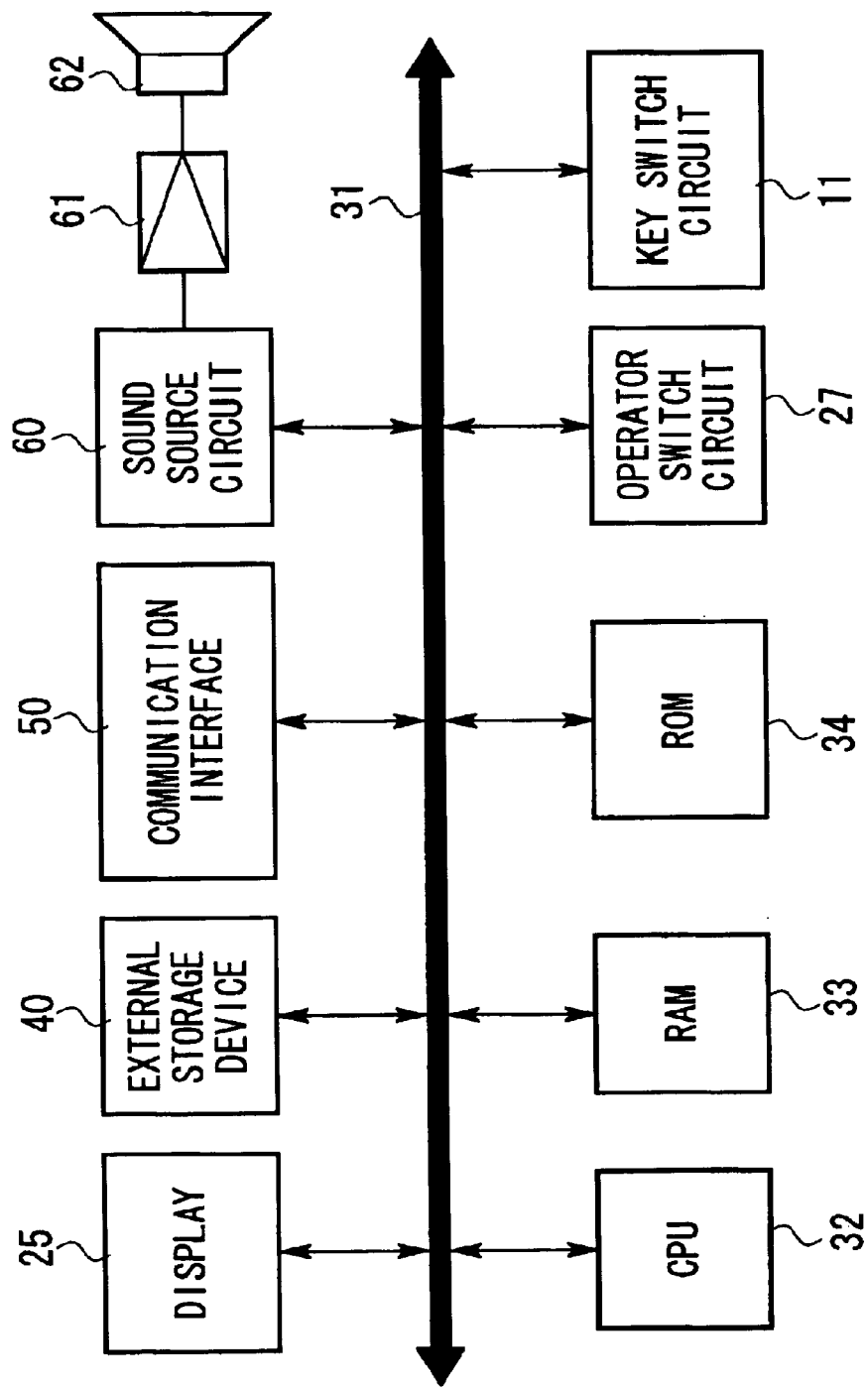
FIG. 2 is a block diagram showing a configuration of electric circuits built in the electronic musical instrument.

FIG. 1 is a plan view diagrammatically showing a part of an appearance of an electronic musical instrument in accordance with embodiment of the invention. FIG. 2 is a block diagram showing electric circuits built in the electronic musical instrument.

The electronic musical instrument of the present embodiment is equipped with a keyboard 10 and an operation panel 20. The keyboard 10 contains a number of keys as manual operable members for music performance (hereinafter, simply referred to as "performance operators"), each of which is provided to designate a specific (tone) pitch and to instruct generation of a corresponding musical tone signal. A key switch circuit 11 contains a number of key switches, which are provided in connection with the keys of the keyboard 10 respectively. Herein, a key operation (i.e., key depression or key release) being applied to each key is detected by its corresponding key switch. An operation panel 20 is equipped with a power switch 21 for applying electric power to the electronic musical instrument, a wheel 22 which is one kind of the performance operator for controlling effects being imparted to musical tone signals, as well as a number of manual operators 23 and 24. Specifically, a reference numeral 23 designates a group of manual operators for selecting states such as tone colors and effects being imparted to the musical tone signals, wherein those manual operators (hereinafter, simply referred to as "select operators") are collectively arranged in a specific area on the operation panel 20. In addition, a reference numeral 24 designates a number of manual operators for changing over modes being set to the electronic musical instrument, wherein those manual operators (hereinafter, simply referred to as "mode operators") contain a system operator 24a and a song operator 24b. Further, the operation panel 20 is equipped with a display 25 and a ten-key unit 26. Herein, the display 25 is configured by a liquid-crystal display for displaying characters and the like on a screen. The ten-key unit 26 is configured by manual operators containing numeric keypads, cursor movement keys and an enter key, which are used to input a variety of data in cooperation with characters or visuals (or images) being displayed on the screen of the display 25. An operator switch circuit 27 contains a number of operator switches in connection with the aforementioned operators 22, 23, 24 and 26. So, an operation being applied to each operator is detected by its corresponding operator switch in the operator switch circuit 27.

All of the key switch circuit 11, display 25 and operator switch circuit 27 are connected with a bus 31. The bus is also connected with a CPU 32, a RAM 33 and a ROM 34, which configure a main unit of a microcomputer, as well as an external storage device 40, a communication interface 50 and a sound source circuit 60.

Figure 3:
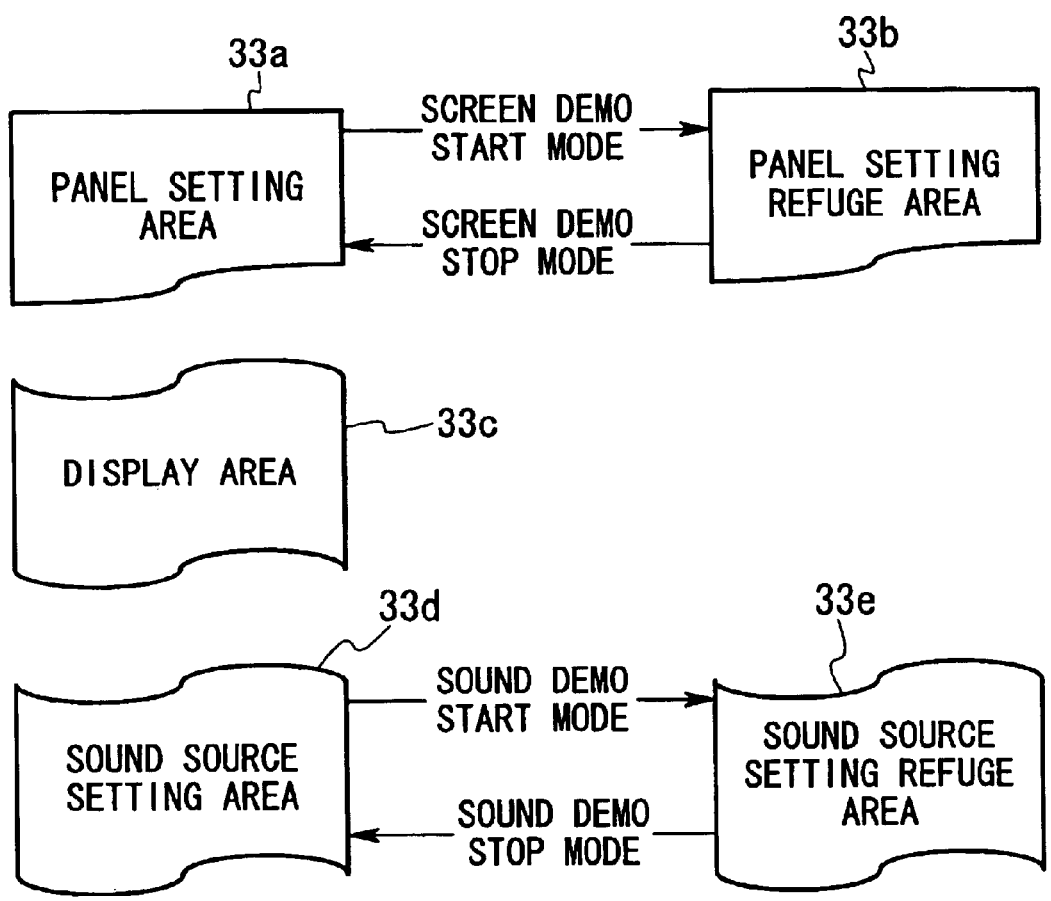
FIG. 3 is a memory map showing storage areas being set to a RAM of the electronic musical instrument shown in FIG. 2.

The CPU 32 runs programs to perform a variety of operations. That is, it detects operations being applied to the keyboard 10 and/or the operation panel 20, it sets various modes to the electronic musical instrument, and it controls generation of musical tone signals. The RAM 33 and ROM 34 are provided to store the programs and a variety of data. Particularly, the RAM 33 stores a variety of storage areas shown in FIG. 3, such as a panel setting area 33a, a panel setting refuge area 33b, a display area 33c, a sound source setting area 33d and a sound source setting refuge area 33e. Herein, the panel setting area 33a stores data representative of setting states of the electronic musical instrument, which are set in response to operations being applied to the manual operators of the operation panel 20, and other setting states. The panel setting refuge area 33b temporarily refuges the aforementioned data. The display area 33c stores data for controlling the display 25. The sound source setting area 33d stores data for determining states of musical tones such as tone colors and sound effects being imparted to musical tone signals formed by the sound source circuit 60. The sound source setting refuge area 33e temporarily refuges the aforementioned data.

The external storage device 40 contains storage media such as compact disks, flexible disks, hard disks and optical disks, which are used to store a variety of data and programs. In addition, the external storage device 40 also contains a (disk) drive, which reads and writes the data and programs to the storage media. The communication interface 50 contains MIDI components (where "MIDI" is an abbreviation for "Musical Instrument Digital Interface") to enable connections with external devices such as other electronic musical instruments and computer devices. Thus, it is possible to input and output programs, performance data and other data by means of the communication interface 50. Herein, the performance data are used to control generation of musical tones and tone colors of musical tones.

The sound source circuit (or tone generator) 60 forms and outputs musical tone signals in accordance with performance data, which are supplied thereto by way of the bus 31. The sound source circuit 60 contains a voice synthesis circuit which inputs voice data representing voice guidance to synthesize voice signals. Incidentally, the sound source circuit 60 is equipped with an amplifier 61 and a speaker 62.

Next, a description will be given with respect to operations of the electronic musical instrument of the present embodiment. That is, a performer (i.e., a human operator who operates the electronic musical instrument) turns the power switch 21 ON to start operation of the electronic musical instrument. In addition, the performer operates the select operators 23 to select a tone color and an effect. Further, the performer operates the keyboard 10 and the wheel 22 to start music performance with the electronic musical instrument, as follows:

The CPU 32 runs programs (not shown) to detect the aforementioned operations made by the performer with respect to the keyboard 10 and the operation panel 20. Thus, the CPU 32 creates performance data for designating the tone color and effect being imparted to musical tones and other performance data for controlling generation of musical tones. Those performance data are supplied to the sound source circuit 60 by way of the bus 31. The sound source circuit 60 inputs the performance data to form musical tone signals having the designated tone color and effect in response to performance operations being applied to the keys of the keyboard 10 and the wheel 21. Thus, musical tones corresponding to the musical tone signals are produced in the air by means of the amplifier 61 and the speaker 62.

The electronic musical instrument is designed such that the ROM 34 or the external storage device 40 stores programs and data for initiating automatic performance functions (or sequencer functions). By the automatic performance functions, rhythm sounds are automatically produced in accordance with progression of a tune being played. Or, melody sounds and accompaniment sounds are automatically produced in accordance with progression of the tune. For example, when a user of the electronic musical instrument operates the song operator 24b and the ten-key unit 26 to stop execution of the automatic performance functions, the CPU 32 reads out the performance data from the ROM 34 or the external storage device 40 to output them to the sound source circuit 60 by way of the bus 31. As a result, although the user stops the automatic performance functions, the electronic musical instrument produces automatic performance sounds consisting of a series of musical tones which are sequentially produced from the speaker 62 in accordance with the progression of the tune because the sound source circuit 60 continuously forms musical tone signals in response to the performance data being read from the ROM 34 or the external storage device 40.

In addition, the electronic musical instrument of the present embodiment can be connected with other devices and apparatuses by means of the communication interface 25. As those devices and apparatuses, there are provided other electronic musical instruments, apparatuses (e.g., sequencers) for generating automatic performance data and computers, for example. Hence, the electronic musical instrument is supplied with performance data being given from the external corresponding to the other devices and apparatuses. That is, the electronic musical instrument has functions to automatically produce musical tones based on the performance data given from the external in accordance with programs and data stored in the ROM 34 or the external storage device 40. The other devices and apparatuses can be located at remote places. In that case, the electronic musical instrument is supplied with performance data of the other devices and apparatuses by wired communications or wireless communications, so that it is possible to automatically produce musical tones based on the performance data, as follows:

That is, the CPU 32 inputs the performance data being given from the external by means of the communication interface 50. The performance data are supplied to the sound source circuit 60, so that the sound source circuit 60 forms musical tone signals in response to the performance data. Thus, the electronic musical instrument produces musical tones corresponding to the musical tone signals by means of the amplifier 61 and the speaker 62.

As described above, the electronic musical instrument of the present embodiment is capable of producing sounds with performance of the keyboard 10, and it is also capable of playing automatic performance based on preset data thereof. In addition, it is capable of playing music performance based on performance data given from the external. So, the sound source circuit 60, amplifier 61 and speaker 62 cooperate together to generate musical tones in accordance with each performance described above. Incidentally, generation of the musical tones and sounds is initiated by tone-generation instructions being applied the sound source circuit 60.

For sale or exhibition of the electronic musical instruments, salespersons or exhibitors operate the foregoing operators 22, 23, 24 and 26 while playing the keyboard 10 with operating the wheel 21, for example. Thus, the salespersons or exhibitors demonstrate functions of the electronic musical instruments by actually generating musical tones and sounds. In addition, they explain about the electronic musical instruments by displaying information with regard to functions and manual operations how to use the electronic musical instruments. Moreover, visitors who visit stores or exhibition areas normally try to make the aforementioned operations and confirm functions and qualities of the electronic musical instruments. However, some stores or exhibition areas merely display the electronic musical instruments, which are supplied with electric power but which are left unattended and doe not operate at all. In such situation, the electronic musical instruments cannot attract interests of the visitors. So, it is impossible to raise advertisement effects in marketing places.

To solve the aforementioned problems, the electronic musical instrument of the present embodiment is designed such that if it is supplied with electric power but left unattended, it automatically displays demonstration information (or images), or it automatically generates musical tones and sounds.

Next, a description will be given with respect to demonstration information being automatically displayed or demonstration sounds being automatically produced.

Figure 4:
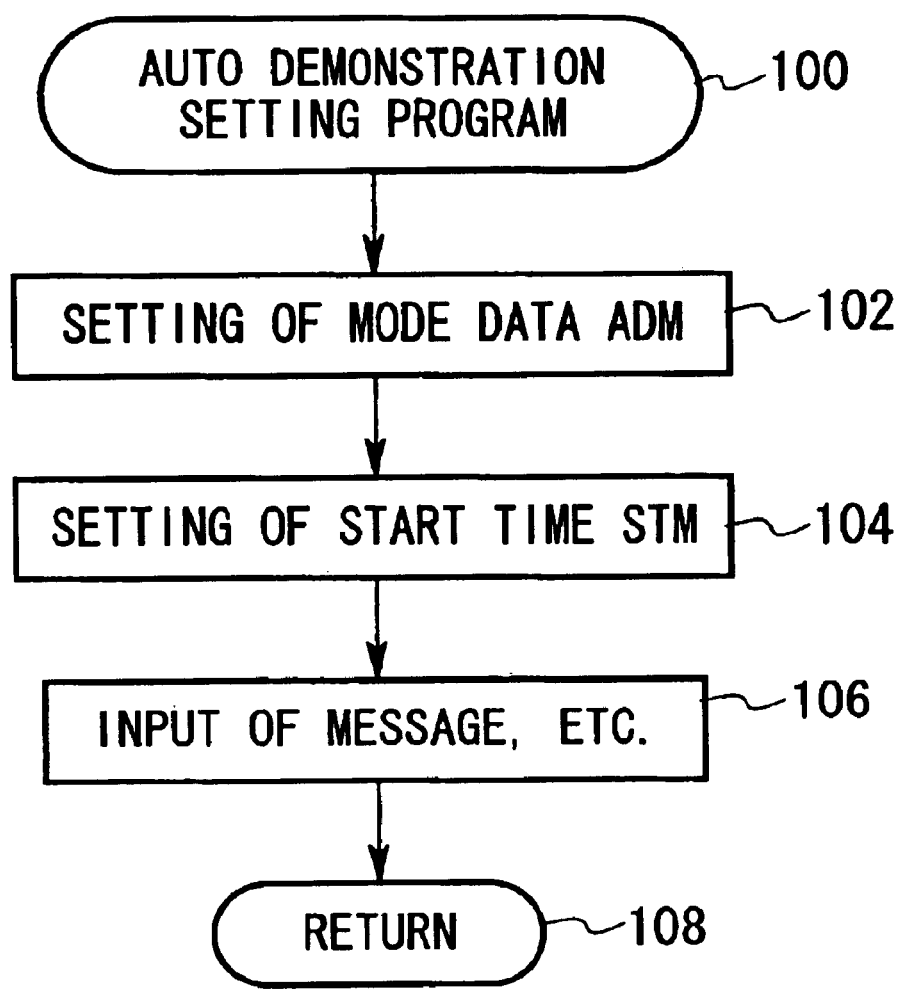
FIG. 4 is a flowchart showing an auto-demonstration setting program.

Suppose that a user (i.e., a salesperson, exhibitor or visitor) operates the system operator 24a on the operation panel 20 of the electronic musical instrument. In that case, the CPU 32 responds to a manual operation applied to the system operator 24a to start an auto-demonstration setting program, which is started from step 100 in a flowchart of FIG. 4. When the auto-demonstration setting program is started, the CPU 32 controls the display 25 to display a screen image corresponding to a menu (see FIG. 5A) on the screen of the display 25 in step 102. The menu provides four modes for demonstration. That is, an "Off" mode is selected if the user do not need demonstration, a "Screen" mode is selected if the user needs only visual displays (or images) for demonstration, a "Sound" mode is selected if the user needs generation of sounds for demonstration, and a "Both" mode is selected if the user needs both of the visual displays and generation of sounds for demonstration. So, the electronic musical instrument waits for designation of the mode which is designated by the user on the screen. In this case, the user selects a specific mode within the four modes for demonstration on the screen by operating and pressing the cursor movement keys and enter key in the aforementioned ten-key unit 26. Thus, data indicative of the selected mode are set to the CPU 32 as mode data ADM.

Figure 5A:
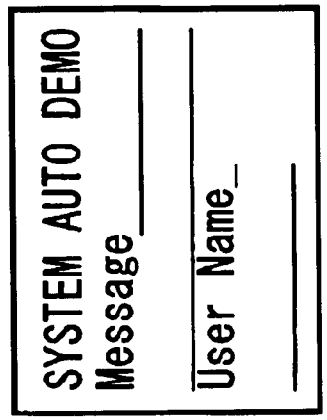
FIG. 5A shows an example of a screen image corresponding to a menu which is displayed when the auto-demonstration setting program is started.
Figure 5B:
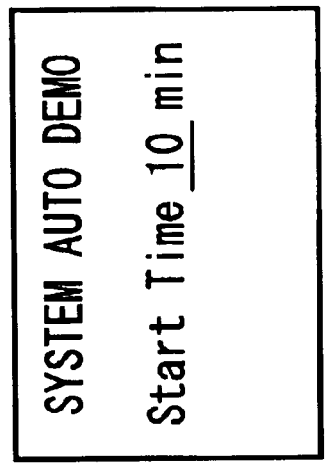
FIG. 5B shows an example of a screen image which is displayed to follow the screen image of FIG. 5A.

After the setting of the mode data ADM on the screen of FIG. 5A, the CPU 32 proceeds to step 104 to change over the screen image of the display 25 to an image of FIG. 5B. So, the CPU 32 waits for input of a start time "STM" on the screen. The start time STM is a period of time which will elapse from the timing at which the user stops performance operations of the keyboard 10 and/or operations to the foregoing operators 22–24 and 26 to the timing at which the CPU 32 starts the visual displays or generation of sounds for demonstration. In addition, the start time STM is a period of time which will elapse from the timing at which the CPU 32 stops instructions for generating musical tones based on performance data being supplied to the sound source circuit 60 in the automatic performance or at which it stops instructions for generating musical tones based on external performance data being supplied to the sound source circuit 60 by means of the communication interface 50 to the timing at which the CPU 32 starts generation of sounds for demonstration. When the user operates the ten-key unit 26 to input a number, the CPU 32 sets the input number as the start time STM.

Figure 5C:
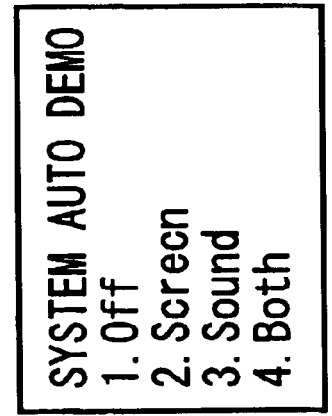
FIG. 5C shows an example of a screen image which is displayed to follow the screen image of FIG. 5B.

After the setting of the start time STM on the screen of FIG. 5B, the CPU 32 proceeds to step 106 to change over the screen image of the display 25 to an image of FIG. 5C. Herein, the CPU 32 waits for inputs of a message and a user name, or else. Thus, the user operates the ten-key unit 26 containing keys to which characters are respectively assigned, so that the user inputs characters representative of some message and the user name on the screen of FIG. 5C. In this case, the CPU 32 deals with the input characters as character data representative of the message and user name. In step 108, the CPU 32 ends the auto-demonstration setting program.

Incidentally, it is necessary to pay attention to the setting of the mode data ADM, start time STM, message and user name. Because, if the user changes the setting of them, particularly the mode data ADM, the electronic musical instrument may operate against the intention of the salesperson or exhibitor. So, the electronic musical instrument can be designed such that a password is required for the setting of the aforementioned data.

Figure 6:
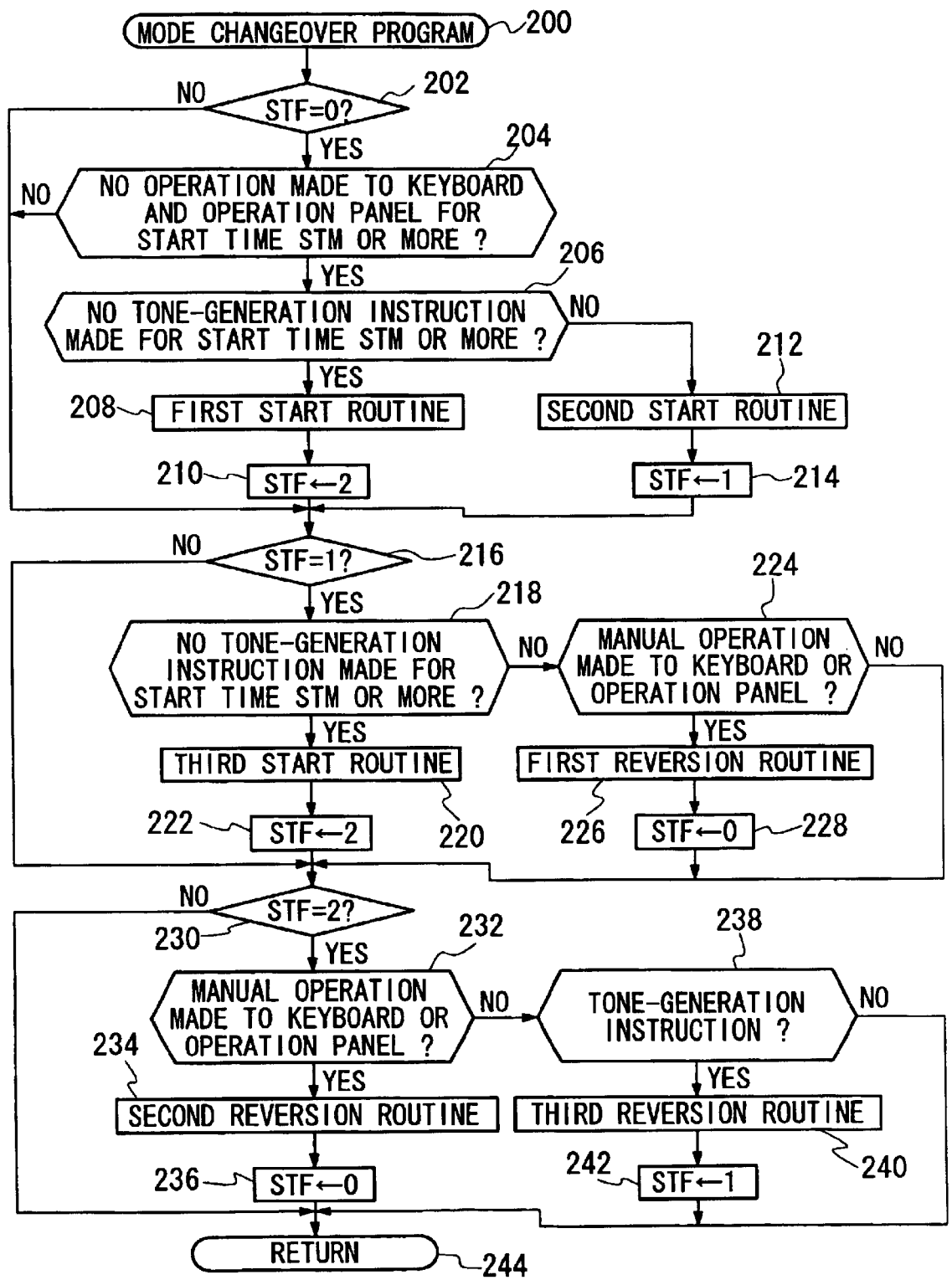
FIG. 6 is a flowchart showing a mode changeover program.

The CPU 32 repeatedly runs a mode changeover program every predetermined time in accordance with a flowchart of FIG. 6. The mode changeover program is started at step 200 in FIG. 6. In step 202, the CPU 32 makes a decision as to whether a state flag STF representative of a state of demonstration of the electronic musical instrument is set at "0" or not. Herein, the state flag STF is set at either "0", "1" or "2". That is, STF=0 indicates a state where the electronic musical instrument is not allowed to perform both of the visual displays and generation of sounds for demonstration. In addition, SFT=1 indicates a state where the electronic musical instrument is allowed to perform only the visual displays for demonstration, while SFT=2 indicates a state where the electronic musical instrument is allowed to perform both of the visual displays and generation of sounds for demonstration.

Now, a description will be given with respect to the aforementioned state where STF=0. In this state, a decision result of the step 202 turns to "YES", so that the CPU 32 transfers control to step 204, in which a decision is made as to whether none of the keys of the keyboard and operators of the operation panel 20 is operated for the start time STM or more or not. If the start time STM does not elapse from a last manual operation to the keyboard 10 or operation panel 20, a decision result of the step 204 is "NO", so that the CPU 32 transfers control directly to step 216. In this case, the electronic musical instrument does not perform both of the visual displays and generation of sounds for demonstration at all. In contrast, if the start time STM has elapsed from the last manual operation to the keyboard 10 or operation panel 20, the decision result of the step 204 is "YES", so that the CPU 32 transfers control to step 206. In step 206, a decision is made as to whether the start time STM has elapsed from a last tone-generation instruction with respect to automatic performance being accomplished by internal functions of the electronic musical instrument or not, or a decision is made as to whether the start time STM has elapsed from a last tone-generation instruction with respect to external performance data being supplied by means of the communication interface 50 or not.

Figure 7:
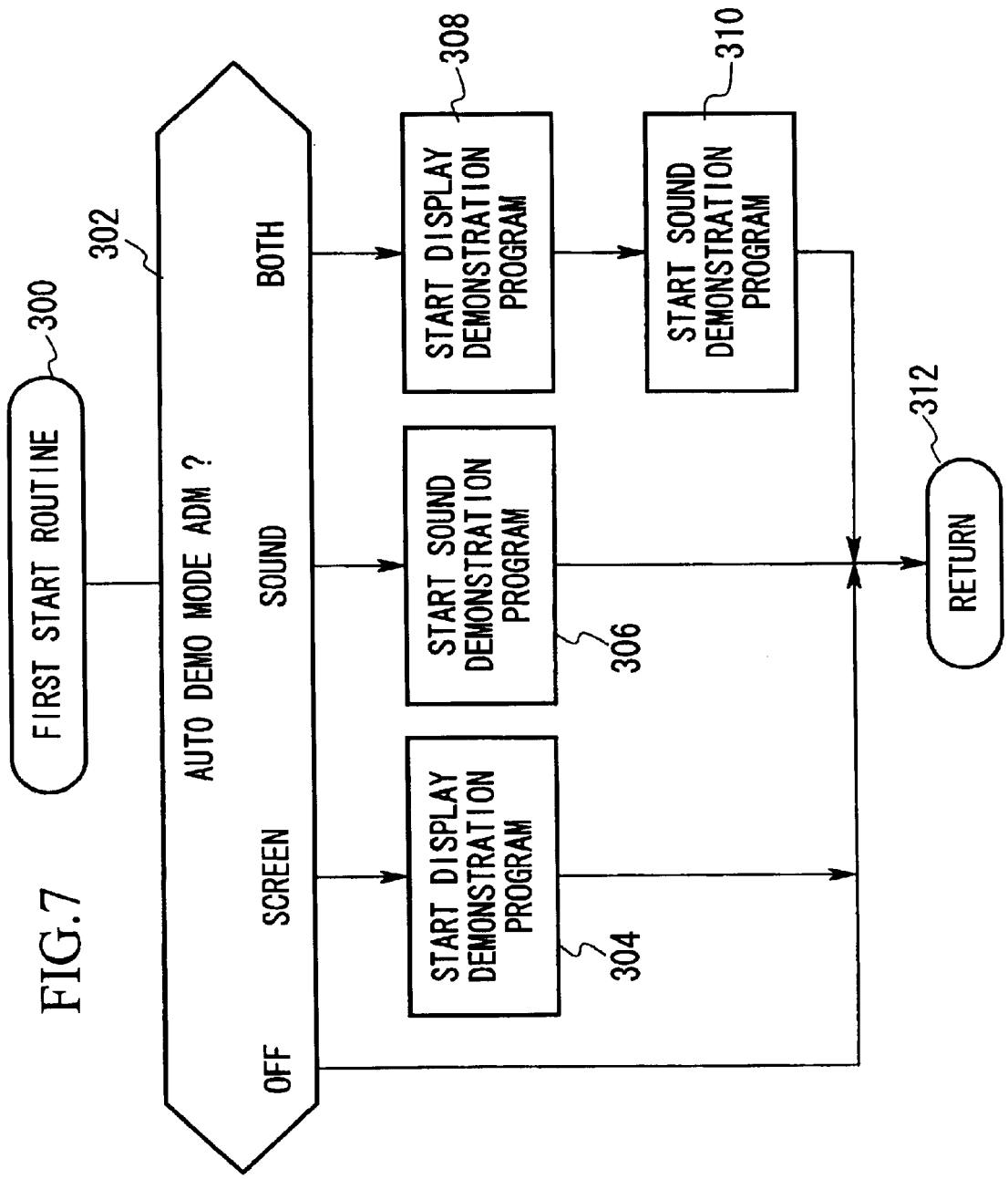
FIG. 7 is a flowchart showing a first start routine.

If the start time STM has elapsed from both of the tone-generation instructions, a decision result of the step 206 is "YES", so that the CPU 32 transfers control to step 208 to run a first start routine, details of which are shown in FIG. 7. In FIG. 7, the CPU 32 starts the first start routine in step 300. In step 302, the CPU 32 discriminates one of the demonstration modes being designated by the mode data ADM. If the mode data ADM designate the "Off" mode for demonstration, the CPU 32 ends execution of the first start routine at the step 302, so that it reverts control to a main routine (i.e., mode changeover program of FIG. 6) in step 312. In this case, the electronic musical instrument does not perform the visual displays and generation of sounds for demonstration at all.

Figure 13:
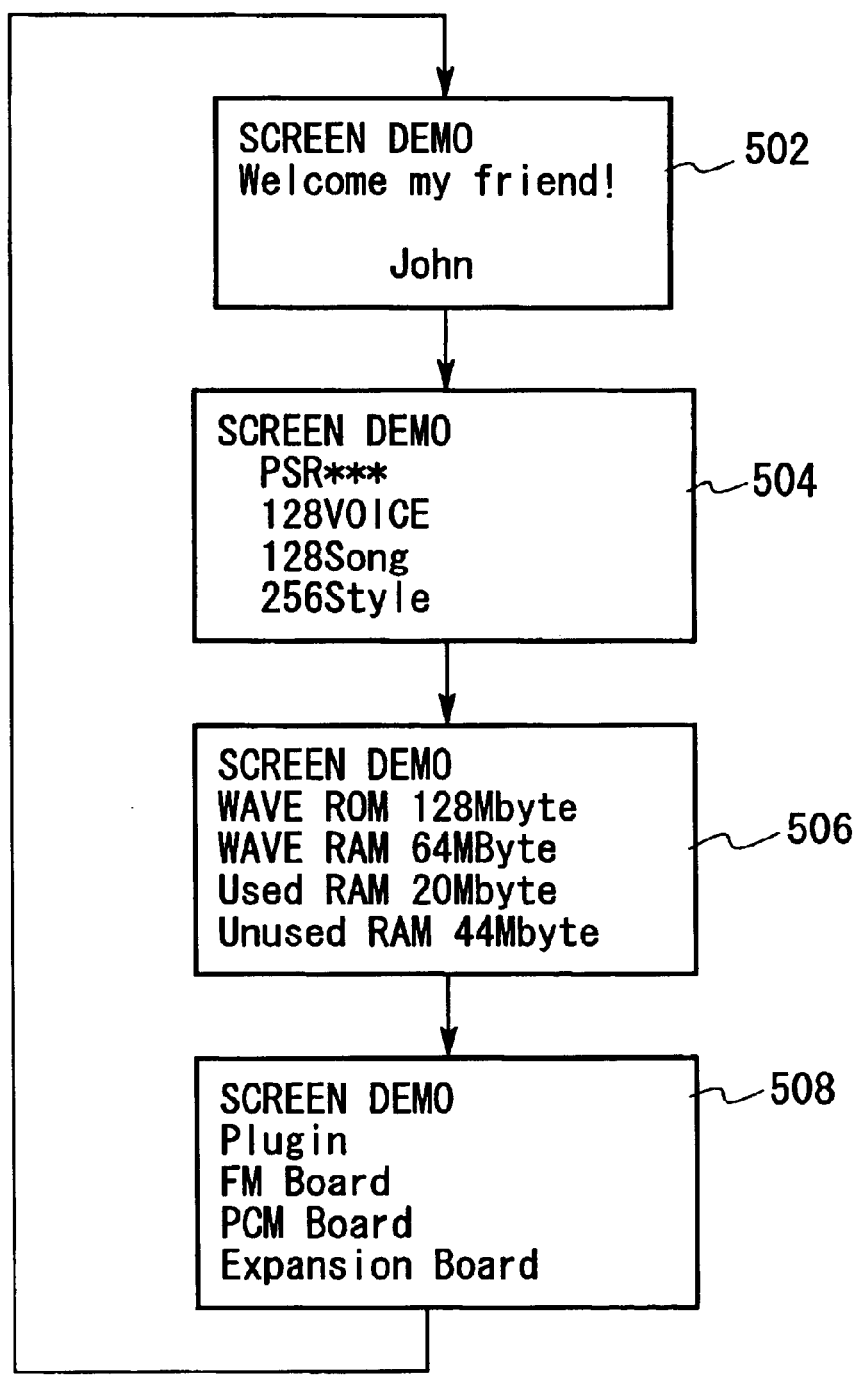
FIG. 13 shows a series of screen images being changed periodically on a screen of a display in accordance with a display demonstration program.

When the mode data ADM designate the "Screen" mode for demonstration, the step 320 discriminates it so that the CPU 32 transfers control from step 302 to step 304. In step 304, the CPU 32 runs a display demonstration program in accordance with a flowchart of FIG. 13. When the display demonstration program is started, stored data of the panel setting area 33a refuge and are transferred to the panel setting refuge area 33b. Then, the CPU 32 repeats steps 502 to 508 of the display demonstration program of FIG. 13 sequentially to display a variety of contents on the screen of the display 25, as follows:

i) Message and user name which are input by the user.
ii) Specifications of the electronic musical instrument, i.e., a number of tone colors being selected, a number of tunes and a number of rhythm types being selected in automatic performance, system configurations of the electronic musical instrument, and total capacities, pre-occupied capacities and available capacities of the RAM 33 and ROM 34.
iii) Various "plug-in" boards of the electronic musical instrument, which are periodically changed over on the screen every predetermined time.

Instead of the aforementioned contents, it is possible to display description for manual operations how to use the electronic musical instrument, and a method to create tone color data for determining tone colors, which are periodically changed over on the screen, for example.

If the mode data ADM designate the "Sound" mode, the step 302 discriminates it, so that the CPU 32 transfers control from step 302 to step 306. In step 306, the CPU 32 runs a sound demonstration program in accordance with a flowchart of FIG. 14A. When the sound demonstration program is started, stored data of the sound source setting area 33d refuge and are transferred to the sound source setting refuge area 33e. Then, the CPU 32 repeatedly performs a step 510 of the sound demonstration program of FIG. 14A, so that the sound source circuit 60 is sequentially supplied with performance data stored in the RAM 33, ROM 34 or external storage device 40 to play automatic performance. In the automatic performance, the sound source circuit 60 is capable of periodically changing tunes being played in turn, or it is capable of repeating a same single tune. As the performance data, it is possible to use performance data which are used in automatic performance being instructed by a manual operation to the foregoing song operator 24b. Basically, however, the sound source circuit 60 is supplied with the performance data, regardless of the tone-generation instructions concerned with automatic performance which is played by the internal functions of the electronic musical instrument, or the tone-generation instructions concerned with external performance data which are supplied to the electronic musical instrument by means of the communication interface 50. Namely, the electronic musical instrument plays the automatic performance, which is irrelevant to the instructions of the user.

If the mode data ADM designate the "Both" mode, the step 302 discriminates it, so that the CPU 32 transfers control from step 302 to step 308. In step 308, the CPU 32 runs the aforementioned display demonstration program. In addition, the CPU 32 runs the sound demonstration program in step 310. When both of the programs are started, the CPU 32 performs the foregoing "refuge" operations. That is, stored data of the panel setting area 33a refuge and are transferred to the panel setting refuge area 33b, while stored data of the sound source setting area 33d refuge and are transferred to the sound source setting refuge area 33e. After both of the programs are started, the CPU 32 performs the display demonstration program of FIG. 13 and the sound demonstration program of FIG. 14A to run in parallel. Thus, the electronic musical instrument automatically performs the visual displays for demonstration on the screen of the display 25, while it also automatically generate sounds corresponding to musical tone signals by the sound source circuit 60.

Figure 14A:
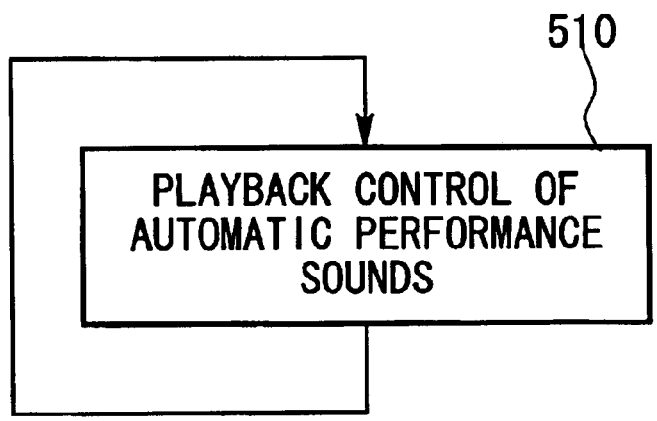
FIG. 14A is a brief flowchart showing a sound demonstration program realizing playback of automatic performance sounds.
Figure 14B:
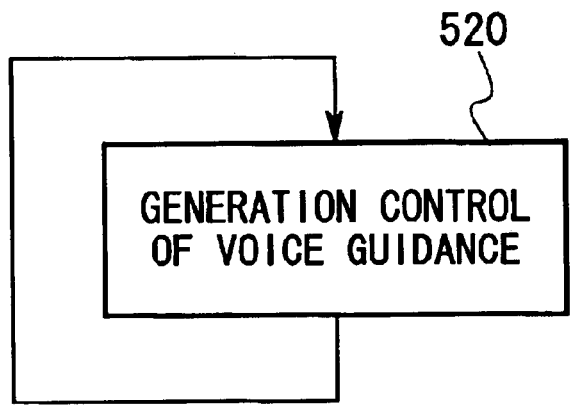
FIG. 14B is a brief flowchart showing a voice demonstration program realizing voice guidance.

In the case of the Both mode described above, it is possible to employ a voice demonstration program of FIG. 14B instead of the sound demonstration program of FIG. 14A. Or, it is possible to perform both of the aforementioned programs of FIGS. 14A and 14B. In the voice demonstration program of FIG. 14B, the CPU 32 repeatedly performs step 520, so that it reads out voice data from the RAM 33, ROM 34 or external storage device 40 in synchronization with the contents of the visual displays being displayed on the screen of the display 25. Specifically, the CPU 32 reads out voice data representing the contents of the visual displays or voice data vocalizing preset description concerned with the contents of the visual displays. Those voice data are supplied to the sound source circuit 60 to activate a voice synthesis circuit built in the sound source circuit 60. Thus, it is possible to produce vocalized sounds representative of the voice guidance with regard to the contents of the visual displays, or it is possible to produce vocalized sounds of the description concerned with the contents of the visual displays as the voice guidance. Such voice guidance is particularly effective in the Both mode. Incidentally, the voice guidance can be made in the Sound mode as well.

With reference to the mode changeover program of FIG. 6, the CPU 32 transfers control from step 208 regarding the first start routine to step 210 in which "2" is set to the state flag STF. Then, the CPU 32 proceeds to step 216.

In the aforementioned step 206, if the start time STM has not elapsed from the last tone-generation instruction with regard to the automatic performance which is made by the internal functions of the electronic musical instrument, or if the start time STM has not elapsed from the last tone-generation instruction with regard to the external performance data which are supplied to the electronic musical instrument by means of the communication interface 50, a decision result of the step 206 is "NO", so that the CPU 32 transfers control to step 212 to run a second start routine, details of which are shown in FIG. 8. The second start routine is started at step 320 in FIG. 8. In step 322, a decision is made as to whether the mode data ADM designate the Screen mode, Both mode or not. If the mode data ADM do not designate the Screen mode or the Both mode, a decision result of the step 322 is "NO", so that the CPU 32 ends the second start routine in step 326. In this case, the electronic musical instrument does not perform the visual displays and generation of sounds for demonstration at all.

If the mode data ADM designate the Screen mode or the Both mode, the CPU 32 transfers control to step 324 because the decision result of the step 322 is "YES". In step 324, the CPU 32 runs the display demonstration program in accordance with the foregoing flowchart of FIG. 13. When the display demonstration program is started, stored data of the panel setting area 33a refuge and are transferred to the panel setting refuge area 33b. In addition, the electronic musical instrument automatically displays visual images on the screen of the display 25.

With reference to the mode changeover program of FIG. 6, the CPU 32 transfers control from step 212 regarding the second start routine to step 214 in which "1" is set to the state flag STF. Then, the CPU 32 proceeds to step 216.

Next, a description will be given with respect to operation of the electronic musical instrument in a state where "1" is set to the state flag STF. In this state, a decision result of step 216 is "YES", so that the CPU 32 transfers control to step 218, content of which is similar to the foregoing step 206. That is, a decision is made as to whether the start time STM has elapsed from the last tone-generation instruction in the automatic performance which is played by the internal functions of the electronic musical instrument or not, or a decision is made as to whether the start time STM has elapsed from the last tone-generation instruction regarding the external performance data which are supplied to the electronic musical instrument by means of the communication interface 50 or not. If the start time STM has already elapsed from the aforementioned last tone-generation instructions, a decision result of the step 218 is "YES", so that the CPU 32 transfers control to step 220 to run a third start routine, details of which are shown in FIG. 9. The third start routine is started at step 330 in FIG. 9. In step 332, a decision is made as to whether the mode data ADM designate the Sound mode, Both mode or not. If the mode data ADM do not designate the Sound mode or the Both mode, a decision result of step 332 is "NO", so that the CPU 32 ends the third start routine in step 336. In this case, the electronic musical instrument performs the visual displays for demonstration on the screen of the display 25 but does not generate the sounds for demonstration. However, the electronic musical instrument generates musical tones of the automatic performance which is played by the internal functions thereof, or the electronic musical instrument generates musical tones based on the external performance data which are supplied thereto by means of the communication interface 50.

If the mode data ADM designate the Sound mode or the Both mode, the CPU 32 transfers control from step 332 to step 334 because the decision result of the step 332 is "YES". In step 334, the CPU 32 runs the sound demonstration program of FIG. 14A or the voice demonstration program of FIG. 14B. When the sound demonstration program is started, stored data of the sound source setting area 33d refuge and are transferred to the sound source setting refuge area 33e. In addition, the electronic musical instrument performs automatic generation of the sounds for demonstration in addition to automatic display of the images for demonstration.

With reference to FIG. 6, the CPU 32 transfers control from step 220 regarding the third start routine to step 222, in which "2" is set to the state flag STF. Then, the CPU 32 proceeds to step 230.

By the way, if the decision result of the step 218 is "NO" after the decision result of the step 216 is "YES", the CPU 32 transfers control to step 224 in which a decision is made as to whether a manual operation is made on any of the keys of the keyboard 10, any of the operators of the operation panel 20 or not. Different from the aforementioned step 204, the step 224 merely detects a manual operation of some key or operator regardless of time. If none of the keys of the keyboard 10 and operators of the operation panel 20 is operated by the user, a decision result of the step 224 is "NO", so that the CPU 32 transfers control directly to step 230 from step 224. In this case, the electronic musical instrument merely displays the images for demonstration.

If the step 224 detects a manual operation being applied to any one of the keys of the keyboard 10 or operators of the operation panel 20, the decision result of the step 224 is "YES", so that the CPU 32 transfers control to step 226 to run a first reversion routine, details of which are shown in FIG. 10. The first reversion routine is started at step 400 in FIG. 10. In step 402, a decision is made as to whether the mode data ADM designate the Screen mode, Both mode or not. If the mode data ADM do not designate the Screen mode or the Both mode, a decision result of the step 402 is "NO", so that the CPU 32 ends the first reversion routine in step 408.

If the mode data ADM designate the Screen mode or the Both mode, the decision result of the step 402 is "YES", so that the CPU 32 transfers control from step 402 to step 404. In step 404, "refuge" data stored in the panel setting refuge area 33b are returned to the panel setting area 33a. In addition, the display area 33c restores data thereof on the basis of the data returned to the panel setting area 33a, so that the display 25 reverts images thereof from the images for demonstration to original ones, which are originally displayed on the screen before execution of the demonstration program(s). After the step 404, the CPU 32 proceeds to step 406 to control the electronic musical instrument to be in an original condition where musical tones are generated and controlled in response to manual operations made on the keyboard 10 and the operation panel 20. Thus, the electronic musical instrument is completely reverted to the original condition by the first reversion routine. After completion of the first reversion routine of step 226 (see FIG. 6), the CPU 32 transfers control to step 228 in which "0" is set to the state flag STF. Then, the CPU 32 proceeds to step 230. In this case, the electronic musical instrument does not perform the visual displays for demonstration and generation of sounds for demonstration at all. However, the electronic musical instrument is reverted to the original condition that allows the setting of tone colors and effects on the screen of the display 25 with manual operations made on the operators of the operation panel 20. In addition, the electronic musical instrument is placed in a condition that allows generation of musical tones with performance of the keyboard 10.

Next, a description will be given with respect to operation of the electronic musical instrument in a state where "2" is set to the state flag STF. In this state, a decision result of the step 230 is "YES", so that the CPU 32 transfers control to step 232, which is similar to the foregoing step 224. That is, a decision is made as to whether a manual operation is made to any of the keys of the keyboard 10 or any of the operators of the operation panel 20 or not. If no manual operation is made on the keyboard 10 or the operation panel 20, a decision result of the step 232 is "NO", so that the CPU 32 proceeds directly to step 238. In step 238, a decision is made as to whether a tone-generation instruction is issued with respect to the automatic performance which is played by the internal functions of the electronic musical instrument or not, or a decision is made as to whether a tone-generation instruction is issued with respect to the external performance data which are supplied to the electronic musical instrument by means of the communication interface 50 or not. Different from the foregoing steps 206 and 218, the step 238 merely detects the tone-generation instructions regardless of time. If the step 238 does not detect the tone-generation instructions at all, a decision result of the step 238 is "NO", so that the CPU 32 ends the mode changeover program in step 244. In this case, the state flag STF is retained at "2", so the electronic musical instrument continuously performs both of the visual displays for demonstration and generation of sounds for demonstration.

Figure 11:
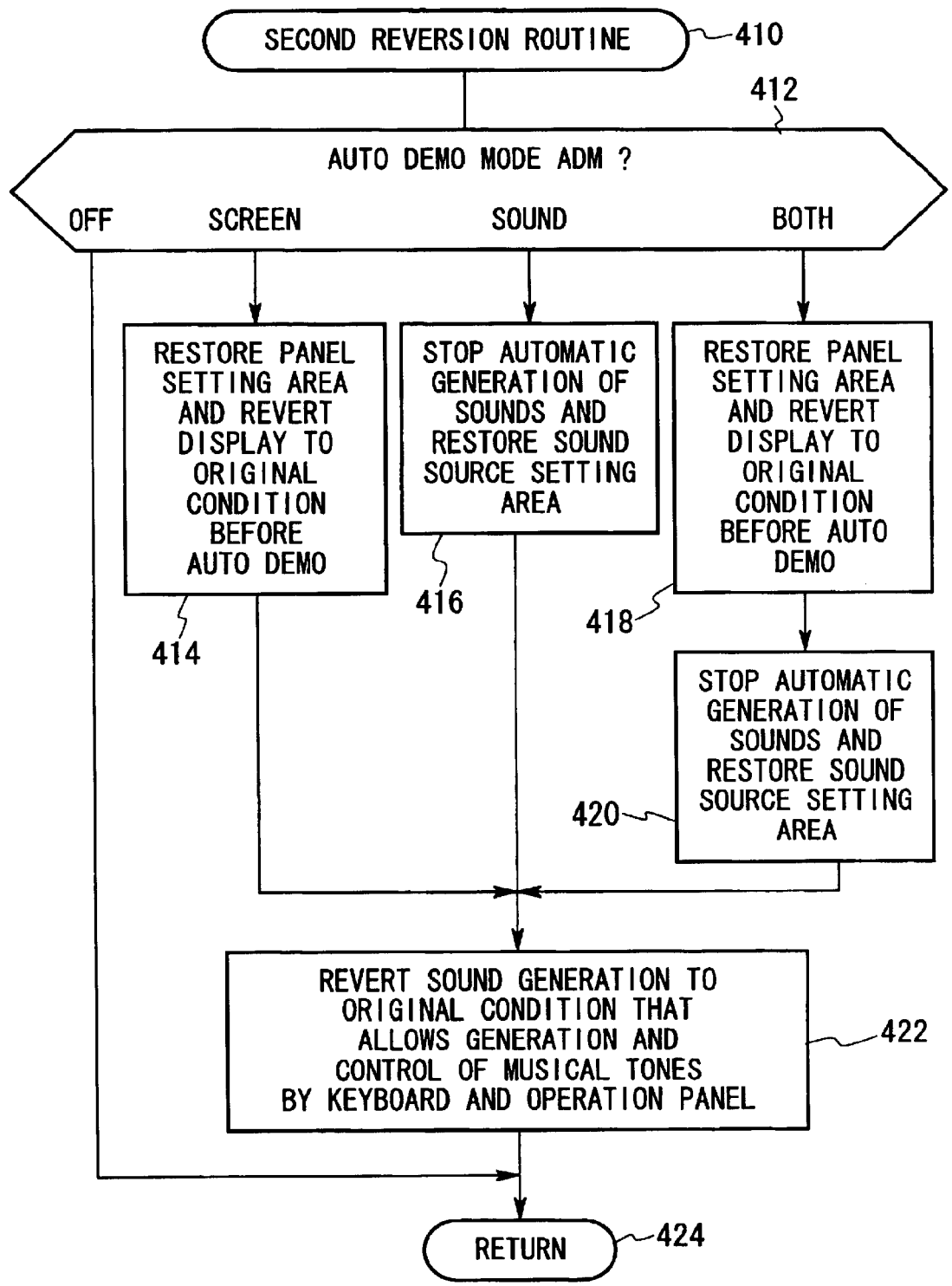
FIG. 11 is a flowchart showing a second reversion routine.

If the step 232 detects the manual operation made to any of the keys of the keyboard 10 or any of the operators of the operation panel 20, the decision result of the step 232 is "YES", so that the CPU 32 proceeds to step 234 to run a second reversion routine, details of which are shown in FIG. 11. The second reversion routine is started at step 410 in FIG. 11. In step 412, a decision is made as to whether the mode data ADM designate the Off mode, Screen mode, Sound mode, Both mode or not. If the mode data ADM designate the Off mode, the step 412 discriminates it, so that the CPU 32 ends the second reversion routine in step 424. If the mode data ADM designate the Screen mode, the step 412 discriminates it, so that the CPU 32 proceeds to steps 414 and 422, contents of which are similar to the foregoing steps 404 and 406 shown in FIG. 10. Then, the CPU 32 ends the second reversion routine in step 424.

If the mode data ADM designate the Sound mode, the step 412 discriminates it, so that the CPU 32 proceeds to step 416 in which it stops generation of the sounds for demonstration. In addition, "refuge" data stored in the sound source setting refuge area 33e are returned to the sound source setting area 33d. After completion of the step 416, the CPU 32 proceeds to step 422, the content of which is similar to the foregoing step 406. Thereafter, the CPU 32 ends the second reversion routine in step 424. If the mode data ADM designate the Both mode, the step 412 discriminates it, so that the CPU 32 proceeds to steps 418 and 420, contents of which are similar to the foregoing steps 404 and 416. Then, the CPU 32 proceeds to the aforementioned step 422. After completion of the step 422, the CPU 32 ends the second reversion routine in step 424.

With reference to the mode changeover program of FIG. 6, the CPU 32 transfers control from step 234 regarding the second reversion routine to step 236 in which "0" is set to the state flag STF. Then, the CPU 32 ends the mode changeover program in step 244. In this case, the electronic musical instrument is reverted to the original condition that allows the setting of tone colors and effects for musical tones on the screen of the display in accordance with manual operations on the operation panel 20 and the original condition that allows generation of musical tones with performance of the keyboard 10.

Figure 12:
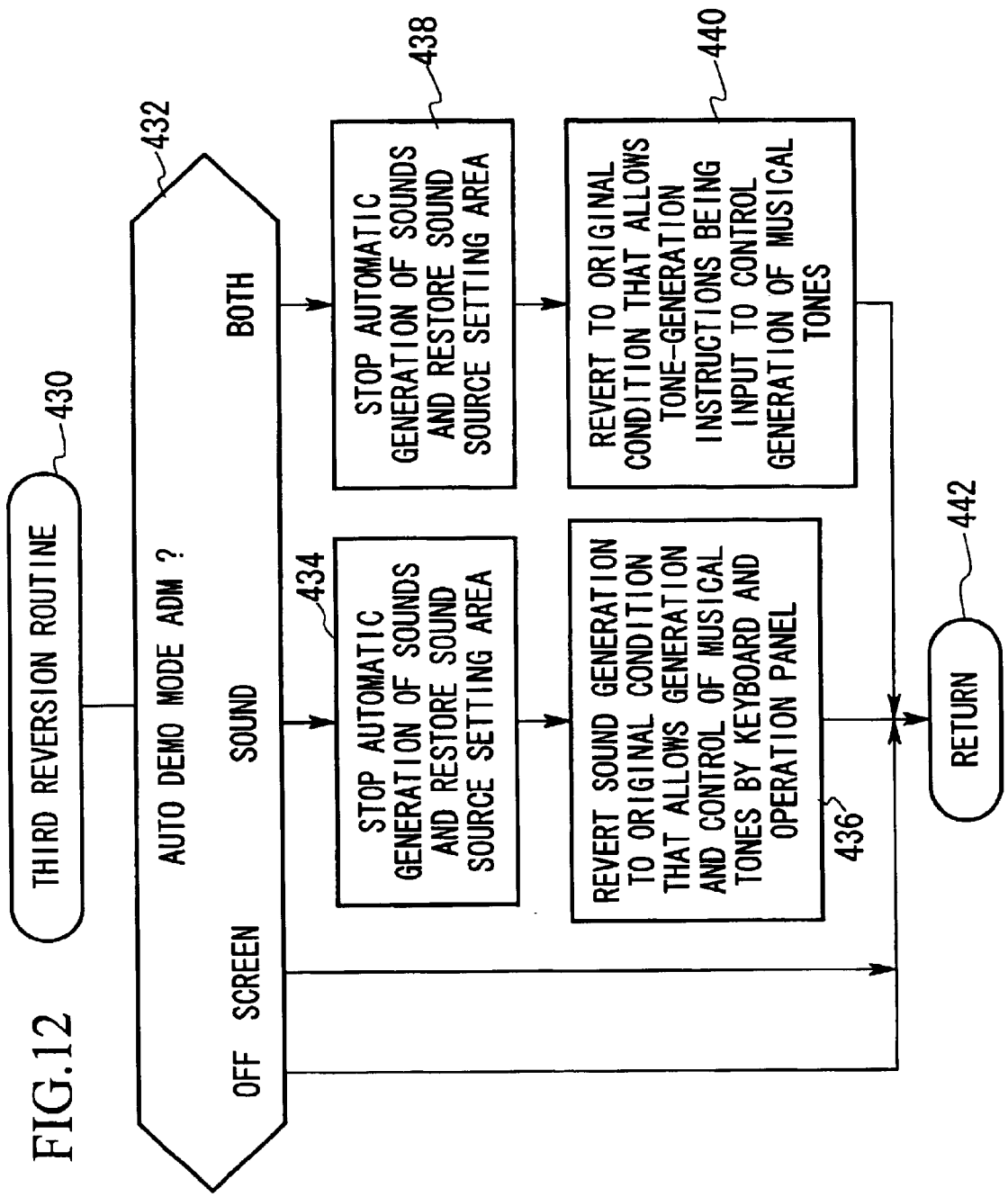
FIG. 12 is a flowchart showing a third reversion routine.

Under the aforementioned state where "2" is set to the state flag STF, if a tone-generation instruction is issued with respect to the automatic performance which is played by the internal functions of the electronic musical instrument or a tone-generation instruction is issued with respect to the external performance data which are supplied to the electronic musical instrument by means of the communication interface 50, the decision result of the step 238 is "YES", so that the CPU 32 proceeds to step 240 to run a third reversion routine, details of which are shown in FIG. 12. The third reversion routine is started at step 430 in FIG. 12. In step 432, a decision is made as to which of the Off mode, Screen mode, Sound mode and Both mode the mode data ADM designate. If the mode data ADM designate the Off mode or the Screen mode, the step 432 discriminates it, so that the CPU 32 ends the third reversion routine in step 442. If the mode data ADM designate the Sound mode, the step 432 discriminates it, so that the CPU 32 proceeds to steps 434 and 436, contents of which are similar to the foregoing steps 416 and 422 shown in FIG. 11. Then, the CPU 32 ends the third reversion routine in step 442. In this case, the electronic musical instrument is reverted to the original condition that allows the setting of tone colors and effects on the screen of the display 25 in accordance with manual operations made on the operation panel 20 and the original condition that allows generation of musical tones with performance of the keyboard 10.

If the mode data ADM designate the Both mode, the step 432 discriminates it, so that the CPU 32 proceeds to step 438, content of which is similar to the foregoing step 416. After completion of the step 438, the CPU 32 proceeds to step 440. In step 440, the electronic musical instrument is placed in a condition that allows issuance of tone-generation instructions with respect to automatic performance which is played by the internal functions thereof, or it is placed in a condition that allows issuance of tone-generation instructions with respect to external performance data which are supplied thereto by means of the communication interface 50. Thereafter, the CPU 32 ends the third reversion routine in step 442. With reference to the mode changeover program of FIG. 6, after completion of the third reversion routine of step 240, the CPU 32 proceeds to step 242 in which "1" is set to the state flag STF. Thereafter, the CPU 32 ends the mode changeover program in step 244.

As described heretofore, the electronic musical instrument of the present embodiment is designed to perform a series of operations for demonstration, as follows:

That is, the aforementioned programs are activated if the user does not at all touch and operate the keyboard 10 and/or the operation panel 20 for the start time STM or more, or if tone-generation instructions are not issued for the start time STM or more with respect to the automatic performance which is played by the internal functions of the electronic musical instrument, or if tone-generation instructions are not issued for the start time STM or more with respect to the external performance data which are supplied to the electronic musical instrument by means of the communication interface 50. In that case, the CPU 32 proceeds to the aforementioned start routines (see steps 208, 212, 220 in FIG. 6) by way of the steps 204, 206, 218 respectively making the foregoing decisions. Thus, the electronic musical instrument automatically displays the images for demonstration, such as the specifications and system configurations of the electronic musical instrument and messages, on the screen of the display 25. In addition, the electronic musical instrument automatically generates automatic performance sounds and/or other sounds of voice guidance for demonstration by means of the sound source circuit 60. Therefore, the electronic musical instrument of the present embodiment whose power switch 21 is turned ON is displayed and arranged at the store or in the exhibition area, so that it is possible to raise advertisement effects to attract interests of the visitors. Then, the electronic musical instrument is reverted to the original condition that allows the user to restart manual operations on the keyboard 10 and/or the operation panel 20. Or, the electronic musical instrument restarts issuance of tone-generation instructions with respect to the automatic performance being played by the internal functions thereof, or the electronic musical instrument restarts issuance of tone-generation instructions with respect to the external performance data being supplied thereto by means of the communication interface 50. In the aforementioned cases, the CPU 32 proceeds to the reversion routines (see steps 226, 234, 240 in FIG. 6) by way of the steps 224, 232, 238 respectively making the foregoing decisions. Thus, the electronic musical instrument immediately cancel the visual displays for demonstration and/or generation of sounds for demonstration. That is, the electronic musical instrument is reverted to the normal condition that allows the setting of tone colors on the screen of the display 25 and the performance using the keyboard 10.

Incidentally, the present embodiment uses the same time (i.e., start time STM) commonly for the different purposes, as follows:

i) To automatically start demonstrations after the user stops operating the keyboard 10 and/or the operators 22, 23, 24 and 26 on the operation panel 20.

ii) To automatically start demonstrations after issuance of tone-generation instructions is stopped with respect to the automatic performance which is played by supplying the performance data to the sound source circuit 60 in accordance with the internal functions.

iii) To automatically start demonstrations after issuance of tone-generation instructions is stopped with respect to the external performance data which are supplied to the sound source circuit 60 by means of the communication interface 50.

However, it is possible to modify the present embodiment such that different times (STM) are respectively used for the aforementioned purposes. For example, the aforementioned step 104 (see FIG. 4) is modified to input two kinds of times as the start time STM, wherein one of them is used for the time required for the purpose i) while the other is used for the time required for the purposes ii) and iii). In that case, those times are adequately used in the mode exchange program of FIG. 6 to suit to the aforementioned steps 204, 206, 218 respectively.

Lastly, the present embodiment describes the electronic musical instrument as a hardware system or device installing the foregoing programs. Of course, this invention is not limited to such hardware structure but is actualized by software processing. For example, all parts of the electronic musical instrument can be realized using a personal computer or else, in which they are displayed on a screen so that the user operates them with clicks of a mouse or else. In that case, programs actualizing the parts of the electronic musical instrument are provided by storage medium such as floppy disks, compact disks and the like, or they are provided and downloaded from some computer networks such as Internet. Specifically, the present embodiment can be redesigned to exclude the memories as the storage of information (e.g., performance data and programs), so that necessary information is provided by way of MIDI terminals from the Internet, for example.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. An electronic musical instrument comprising:
a plurality of manual operators;
a communication interface;
a sound source circuit for generating musical tone signals in response to performance data that are supplied thereto, wherein the performance data including at least one of manual operation performance data that are generated upon manual operation on at least one of the plurality of manual operators, automatic performance data that are generated by automatic performance, and external performance data that are supplied thereto via a communication line;

a display device for displaying information on a screen;

a first detector for detecting a first non-supply condition where the sound source circuit is not supplied with the manual operation performance data for a first time period;

a second detector for detecting a second non-supply condition where the sound source circuit is not supplied with the automatic performance data or the external performance data for a second time period; and a display controller for controlling the display to automatically display demonstration images in response to the first and second non-supply condition.

2. An electronic musical instrument according to claim 1, wherein the first time period is identical in length to the second time period.

3. An electronic musical instrument according to claim 1, wherein the first time period differs in length from the second time period.

4. A demonstration method using an electronic musical instrument that is equipped with a plurality of manual operators, a communication interface, a sound source circuit for generating musical tones in response to performance data that are supplied thereto, said performance data including at least one of manual operation performance data that are generated upon manual operation on at least one of the plurality of manual operators, automatic performance data that are generated by automatic performance, and external performance data that are supplied thereto via a communication line, and a display device for displaying information, said method comprising the step of:

detecting a first non-supply condition where the sound source circuit is not supplied with the manual operation performance data for at least a first period of time;

detecting a second non-supply condition where the sound source circuit is not supplied with the automatic performance data or the external performance data for at least a second period of time; and in response to the first and second non-supply conditions detected, controlling the display device to automatically begin displaying images for demonstration.

5. A machine-readable media storing an executable program that causes an electronic musical instrument, which is equipped with a plurality of manual operators, a communication interface, a sound source circuit for generating musical tones in response to performance data that are supplied thereto, said performance data including at least one of manual operation performance data that are generated upon manual operation on at least one of the plurality of manual operators, automatic performance data that are generated by automatic performance, and external performance data that are supplied thereto via a communication line, and a display device for displaying information, to perform a demonstration method comprising the steps of:

detecting a first non-supply condition where the sound source circuit is not supplied with the manual operation performance data for a first period of time;

detecting a second non-supply condition where the sound source circuit is not supplied with the automatic performance data or the external performance data for a second period of time; and in response to the first and second non-supply conditions detected, controlling the display device to automatically begin displaying images for demonstration.

6. An electronic musical instrument comprising:

a plurality of manual operators;

a communication interface;

a sound source circuit for generating musical tone signals in response to performance data that are supplied thereto, said performance data including at least one of manual operation performance data that are generated upon manual operation on at least one of the plurality of manual operators, automatic performance data that are generated by automatic performance, and external performance data that are supplied thereto via a communication line;

a first detector for detecting a first non-supply condition where the sound source circuit is not supplied with the manual operation performance data for a first period of time;

a second detector for detecting a second non-supply condition where the sound source circuit is not supplied with the automatic performance data or the external performance data for a second time period; and a sound controller for generating musical tone signals for demonstration in response to the first and second non-supply condition.

7. An electronic musical instrument according to claim 6, wherein the first time period is identical in length to the second time period.

8. An electrical musical instrument according to claim 6, wherein the first time period differs in length from the second time period.

9. An electronic musical instrument according to claim 6, further comprising:

a display for displaying information on a screen; and a display controller for controlling the display to automatically start displaying prescribed demonstration images in response to the first non-supply condition detected by the first detector and the second non-supply condition detected by the second detector, wherein if the first detector fails to detect the first non-supply condition and the second detector fails to detect the second non-supply condition, the sound controller does not automatically supply prescribed performance data for demonstration, while the display controller controls the display to automatically start displaying prescribed demonstration images.

10. A demonstration method using an electronic musical instrument that is equipped with a plurality of manual operators, a communication interface, a sound source circuit for generating musical tones in response to performance data that are supplied thereto, said performance data including at least one of manual operation performance data that are generated upon manual operation on at least one of the plurality of manual operators, automatic performance data that are generated by automatic performance, and external performance data that are supplied thereto via a communication line, said demonstration method comprising the steps of:

detecting a first non-supply condition where the sound source circuit is not supplied with the manual operation performance data for a first period of time;

detecting a second non-supply condition where the sound source circuit is not supplied with the automatic performance data or the external performance data for a second period of time; and in response to the first and second non-supply conditions detected, automatically supplying prescribed performance data to the sound source circuit, thereby causing the sound source circuit to generate corresponding musical tone signals for demonstration.

11. A machine-readable media storing an executable program that causes an electronic musical instrument, which is equipped with a plurality of manual operators, a communication interface, a sound source circuit for generating musical tones in response to performance data that are supplied thereto, said performance data including at least one of manual operation performance data that are generated upon manual operation on at least one of the plurality of manual operators, automatic performance data that are generated by automatic performance, and external performance data that are supplied thereto via a communication line, to perform a demonstration method comprising the steps of:

detecting a first non-supply condition where the sound source circuit is not supplied with the manual operation performance data for a first period of time;

detecting a second non-supply condition where the sound source circuit is not supplied with the automatic performance data or the external performance data for a second period of time; and in response to the first and second non-supply conditions detected, automatically supplying prescribed performance data to the sound source circuit, thereby causing the sound source circuit to generate corresponding musical tone signals for demonstration.

* * * * *